United States Statutory Invention Registration [19]

[11] Reg. Number: H485

Rousseau [43] Published: Jul. 5, 1988

[54] FRANGIBLE TARGET WITH HYDRAULIC WARHEAD SIMULATOR

[75] Inventor: David G. Rousseau, Germantown, Md.

[73] Assignee: The United States of America as represented by the Secretary of the Navy, Washington, D.C.

[21] Appl. No.: 651,018

[22] Filed: Sep. 17, 1984

[51] Int. Cl.[4] ..... F41B 9/08

[52] U.S. Cl. ..... 273/362; 273/380

[58] Field of Search ..... 273/360, 359, 362, 363, 273/380, 378; 102/374, 529, 377

[56] References Cited

U.S. PATENT DOCUMENTS

| | | | |
|---|---|---|---|
| 2,840,819 | 6/1958 | McClellan | 343/18 B UX |
| 3,032,970 | 5/1962 | Fox | 102/374 X |
| 3,128,463 | 4/1964 | Hopper . | |
| 3,137,852 | 6/1964 | Hopper | 273/380 X |
| 3,311,324 | 3/1967 | Holt et al. . | |
| 3,466,653 | 9/1969 | Rudduck et al. | 343/18 B |
| 3,699,891 | 10/1972 | Kreuzer et al. | 102/49.3 |
| 3,791,303 | 2/1974 | Sweeney et al. | 102/92.7 |
| 4,000,682 | 1/1977 | Thibodaux, Jr. et al. | 102/374 X |
| 4,076,006 | 2/1978 | Breslow et al. | 446/212 X |
| 4,114,885 | 9/1978 | Morrow | 273/424 |
| 4,131,248 | 12/1978 | Berglund | 244/3.16 |
| 4,140,061 | 2/1979 | Campoli | 102/529 |
| 4,220,092 | 9/1980 | Smith et al. | 102/92.7 |
| 4,222,573 | 9/1980 | Adler | 273/426 |
| 4,326,463 | 4/1982 | Burke et al. | 102/513 |
| 4,407,465 | 10/1983 | Meyerhoff | 244/3.16 |
| 4,479,655 | 10/1984 | Adler | 273/426 X |

FOREIGN PATENT DOCUMENTS 5557 of 1899 United Kingdom ..... 273/380

OTHER PUBLICATIONS

Science Kit, Inc. catalog, 5-1981, Rocket Kit #69918.

*Primary Examiner*—Harold J. Tudor

*Attorney, Agent, or Firm*—Luther A. Marsh

[57] ABSTRACT

An aerial target, which can operate either in a self-propelled or towed configuration, is made of a lightweight, frangible foam material. When employed in the self-propelled configuration, the target includes a remotely controlled guidance system; a remotely controlled guidance system is an optional feature of the target in its towed configuration. The self-propelled target is powered by a solid fuel rocket motor encased in a non-metallic lightweight housing. In order to cause realistic destruction of the target when it is hit by a projectile, a liquid-filled cavity is included in the body of the target. When hit by a projectile, this hydraulic device ruptures and severs the target to simulate warhead detonation and to prevent further flight.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FRANGIBLE TARGET WITH HYDRAULIC WARHEAD SIMULATOR

BACKGROUND OF THE INVENTION

1. Field of the Invention

This invention relates to a target and more particularly to an aerial target.

2. Description of the Prior Art

The target drone of the present invention is related to the target drone shown in a pending application, Ser. No. 06/590,384, filed Mar. 16, 1984, jointly invented by John S. Attinello and David G. Rousseau, entitled Low-Cost, Expendable Crushable Target Aircraft, and is, in part, an improvement thereof.

It is important that weapons crews and weapons systems be realistically tested in order to verify operational readiness. A major element of testing for anti-missile and anti-aircraft crews and weapons is determination of their ability to hit targets flying on a converging course with the weapons platform. In reality, missiles and aircraft on such a course would present a critical threat to the weapons platform. In addition, some current weapons systems, which operate automatically using radar and a computer, "ignore" nonconverging targets as non-threatening. Equally important, however, is determination of ability to hit targets flying by the weapons platform, i.e., targets simulating that large number of missiles and aircraft which, in reality, would be converging on distant points. An ideal target for testing purposes is one that both operates realistically and responds vividly to a hit so that determination of crew and weapon effectiveness can be readily and accurately measured.

A variety of targets have been used to test anti-aircraft and anti-missile weapons and the crews which operate those weapons. One type of target used is a target device towed by a non-target aircraft. An example of this type of target is shown in U.S. Pat. No. 3,128,468. This device comprises a hollow foam shell with means for introducing air under pressure to prevent collapse under aerodynamic loads. A shortcoming of this type of device is that it cannot simulate a converging threat, i.e., safety considerations dictate that the device cannot converge on the weapons platform because of risk that the towing aircraft will be struck by weapons fire. Hence, this device cannot be used to "trigger" an automatic system. Another shortcoming of this device is its lack of guidance system. A typical towing cable is 20,000 feet long. With the cable fully extended, there is a large envelope in which towed targets maneuver. In the past, towing cables have broken, been severed by weapons fire, or simply not kept targets sufficiently aloof. Subsequently, targets have struck or been dragged across weapons platforms causing considerable damage. Backup guidance systems can reduce the possibility of damage caused by a loose or insufficiently elevated target. Further, this type of device is not realistic because it does not behave realistically when struck by weapons fire. Whereas an actual missile or aircraft can be caused to explode and/or to lose sufficient structural integrity to remain airborne when struck by weapons fire, this type of target does not explode and remains airborne behind the towing craft notwithstanding number of hits made on or amount of damage sustained by the target.

A second type of target employed is an unmanned, self-propelled target aircraft, i.e. a drone. Since no towing craft is employed, a drone overcomes the shortcomings of towed targets, mentioned above, and provides a more suitable target to simulate an enemy aircraft or missile on a converging course with the weapons platform. An example of this type of target is shown in the pending application, identified above. This device was invented to replace drones which were heavier (approximately twenty times), more expensive (approximately twenty-six times), and comprising elements that presented a serious hazard upon impact (e.g., aluminum parts, fiberglass parts, and a jet engine), especially impact with a weapons platform during training. This device comprises a target body formed from crushable lightweight foamed material, a solid propellant rocket motor made of a non-metallic lightweight material, a guidance sensor, and a guidance system.

Although the target drone disclosed in the pending application, identified above, effectively overcame all the cost and safety shortcomings of the prior art for a target drone to simulate a converging threat, the target drone disclosed by the pending application is not without a shortcoming. The "soft" nature of this drone makes it virtually invisible to bullets or similar projectiles being fired at it. Whereas if fire from a weapons system hits the warhead of an actual missile, the warhead explodes and destroys the missile, bullets and similar projectiles can pass through this drone without causing catastrophic damage or stopping flight. It is possible for this drone to sustain multiple hits without losing its structural integrity. The drone's unresponsiveness to "hits" hampers determination of a weapons system's effectiveness in striking threatening targets and makes testing less realistic. Certain embodiments of the target of the present invention, although they retain all the advantages and features of the forms of the target described in the pending application, represent a decided advance in the art as they will burst when hit by weapons systems fire.

Other target vehicles have been devised which are frangible, such as are shown in U.S. Pat. Nos. 3,311,324 and 3,128,463. U.S. Pat. No. 3,311,324 teaches use of a remotely-controlled destruct system of a type adapted for explosively severing one wing from a damaged target or drone-aircraft to cause the target to fall within a prescribed impact area. While such a mechanism could be used to abort a drone gone astray, such a mechanism would not necessarily enhance drone responsiveness to hits. Also, this drone is actually less safe than the drone disclosed in the pending application for simulating a converging threat as it carries an explosive charge. Current high electromagnetic interference (EMI) environments surrounding ships and on battlefields render radio control unreliable. There would be a risk that such a drone could strike a ship or weapons implacement in training with the explosive intact and armed. Further, the destruct mechanism comprises metal brackets and pins which would become lethal projectiles upon impact as would other solid parts of the device. Still further, this drone comprises elements which make it much more expensive than the drone disclosed in the pending application.

Another frangible target device is shown in U.S. Pat. No. 3,128,463, described above. Although this towed device cannot safely simulate a converging threat, particularly on an automatic system, it can safely simulate an enemy aircraft or missile converging on a distant point. Fire is properly directed to the side of the target rather than being directed towards it head on. This device is unrealistic as is because it is frangible only in event of impact with the towing craft and not frangible in in case of impact by a testing round. It is worth noting, however, that provided it could be made to behave realistically when struck by weapons fire, its value as a testing target would be significantly enhanced.

SUMMARY OF THE INVENTION

The present invention provides a target, operable in either a self-propelled or towed mode, which facilitates determination of weapons system and weapons crew effectiveness by responding vividly and realistically to a hit. This device, in one or the other of its modes, safely and realistically simulates a converging or nonconverging threat.

Accordingly, one object of the present invention is to provide an aircraft-towed target which can be safely employed and which will burst when struck by a testing round.

Another object of the invention is to provide a lightweight, realistic target drone which will burst when struck by a testing round.

Another object of the invention is to provide a safe, realistic, lightweight, expendable, crushable, frangible target drone.

Other objects, advantages and new features of the invention will become apparent from the following detailed description of the invention when considered in conjunction with the accompanying drawings herein.

DETAILED DESCRIPTION OF THE PREFERRED EMBODIMENT

Although certain embodiments of the target of the present invention comprise an improvement of the drone disclosed in the pending application, identified above, this specification particularly points out all parts of that drone with this improvement and further describes the function of the complete improved drone. This is done for convenience and clarity and to insure that complete understanding of the invention is attained.

Figure 1:
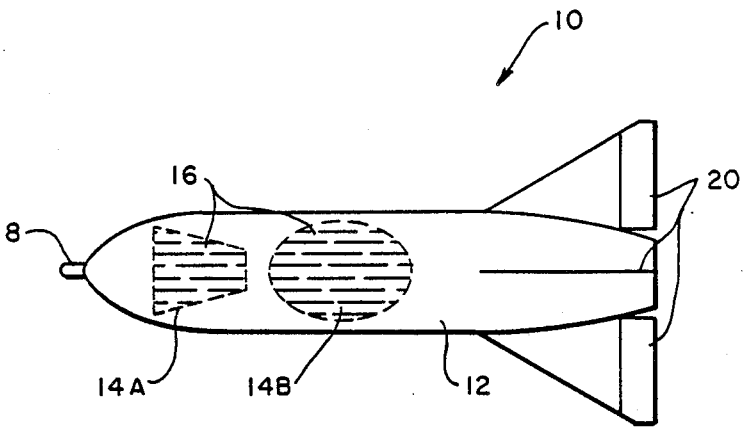
FIG. 1 shows a schematic representation of the present invention in the a towed configuration.

Referring now to the drawings wherin like reference characters designate like or corresponding parts throughout the several views, there is shown in FIG. 1 a schematic representation of the present invention in a towed configuration in which the target is shown generally as 10 and the target body is shown as 12. In such configuration, the invention differs from that shown in FIG. 2 and described below only by comprising fewer elements and by the inclusion of means carried by the body 12 for attaching said body 12 to a tow line for tow by a towing aircraft. In FIG. 1 such means are shown as a swivel hook 8. Further description of the present invention in this configuration is incorporated into the description of the self-propelled configuration below, along with specification of those elements not necessarily included in the invention in this configuration.

Figure 2:
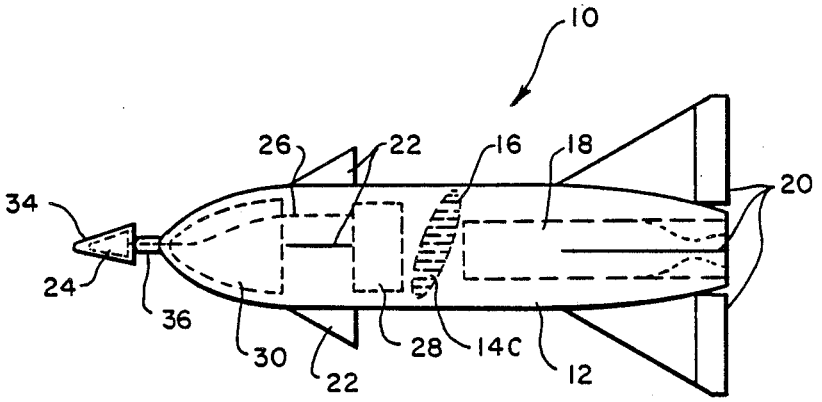
FIG. 2 shows a schematic representation of the present invention in a self-propelled configuration.

Referring now to FIG. 2 wherein the overall arrangement of the present invention is shown as including a rocket-powered drone target shown generally as 10. The body 12 of the target 10 is formed from lightweight crushable energy-absorbing foam material such as a polyurethane foam, the foam material selected to provide predetermined structural characteristics which ensure integrity in flight and the capability to absorb the kinetic energy of the target 10 upon impact, while being lightweight enough to allow free flight and to avoid danger upon impact when used in the self-propelled configuration. The body 12 is shown in the preferred embodiment as being rocket-shaped and may be of any size large enough to be seen by the weapon and hold the requisite elements described hereinbelow, but otherwise should be as small as possible to minimize excess weight and impact damage potential. For example, it may have a wing span of 12 inches and an axial length of 36 inches. Other shapes are also possible, such as an airplane shape with two wings and a tail.

Within the body 12 is at least one cavity 14A, 14B, 14C into which a liquid 16 is disposed so as to fill at least 90 percent of each cavity 14A, 14B, 14C. This or these liquid-filled cavities 14A, 14B, 14C are of such size, shape, and position as to render it likely that one or more of them will be ruptured by a bullet striking the target 10, provided that the size, shape, position, or orientation of these liquid-filled cavities 14A, 14B, 14C does not adversely affect the operation or storability of the target 10. For example, FIG. 1 shows a cavity 14A in the shape of the frustrum of a right circular cone and a cavity 14B in the shape of a sphere; FIG. 2 shows a disk-shaped cavity 14C; but virtually any shape could be used. Shapes with edges or with edges and corners are preferred because those features provide points of stress concentration in case of internal shock. Further, because it is desireable for a projectile to be fully immersed in the liquid 16 in the cavity 14A, 14B, 14C before exiting, a cavity 14A, 14B, 14C should be at least projectile-length thick along that axis a projectile will most likely travel through the cavity 14A, 14B, 14C.

Cavities 14A, 14B, 14C must be positioned so as to not interfere with the installation or operation of any of the other target elements. In the self-propelled configuration, this would most likely be between the guidance control device 28 and the rocket motor 18, both described further below. In the towed configuration, there would be more latitude in positioning because there are less space-consuming elements to position around. As it has been found in practice that towed targets are more effectively towed in flight if the center of gravity is located toward the leading or nose portion of the target, it is preferrable to position the liquid-filled cavities forward toward the nose section of the target to move the center of gravity of the target in that direction also. However, as the liquid 16 in the cavities 14A, 14B, 14C is relatively heavy element in the target 10, in no event should a cavity 14A, 14B, 14C be so far forward, to the rear, or to one side, so as to disrupt the dynamic aeronautic stability of the target 10. In addition, although it is desireable that any points of stress concentration be close to the surface of the target body 12, those points cannot be so close as to undermine the strength of the foam. Considering the lightweight foam used in target 10 construction and the tremendous aerodynamic stresses which targets 10 are subjected to in use, at least one-quarter inch of foam is necessary between any cavity 14A, 14B, 14C and the closest point outside the target 10.

10 cubic inches for a single cavity, e.g. 14C, in a typical, lightweight target 10 would constitute the lower limit for a reasonable volume in order to present a large enough cavity-target, regardless of cavity 14C shape, position, or orientation. Likewise, total volume of numerous small cavities would have to be at least 10 cubic inches. At the upper end, volume would be limited by weight. Assuming 231 cubic inches per gallon of liquid 16, and a liquid 16 weight of approximately 9 pounds per gallon (water: 8.337 lbs.; Ethylene Glycol or 1-2-Ethanediol: 9.31 lbs.), and compensating slightly for reduced body 12 weight because of the cavity-sized lack of foam, 120 cubic inches is about the upper limit for total cavity 14A+14B, 14C size in a typical, lightweight target 10. In a typical target 10, regardless of cavity volume, a cavity-target of at least 10 square inches should face the weapons platform when the target 10 is in position to be fired upon. For larger targets or special purpose smaller targets, it may be necessary to increase or decrease cavity volume respectively in conformity with the approximate size and weight guidelines provided for typical targets.

Orientation of the cavity, e.g. 14C, or cavities. e.g. 14A and 14B, inside the body 12 will vary depending upon how the target 10 is to be used. The cavity. e.g. 14C, or cavities, e.g. 14A and 14B, should be oriented to maximize the effects of a head-on hit for a converging target and a broadside hit for a towed target. In addition, a large cross-sectional area of each cavity 14A, 14B, 14C should be facing the weapons platform when the target 10 is in position to be fired upon.

The frustum of a right circular cone cavity 14A shown in the towed target 10 in FIG. 1 is designed to present a large broadside cavity-target. Further, upon impact on this cavity 14A by a projectile, the target 10 should rupture along the the periphery of the body surrounding the large circular base of the cavity 14A. This would sever the target 10 from the towing cable. After such severance, inrushing air, coupled with pressure exerted by trapped liquid 16, should stop flight immediately and lead to further destruction of the body 12 back towards the smaller circular face of the cavity 10A. Including a second cavity, such as the spherical cavity 14B shown in FIG. 1, provides an even larger broadside total-cavity-target. The target 10 should, when this cavity 14B is struck by a projectile, rupture around the periphery of the target body 12 surrounding said spherical cavity 14B and separate into two distinct parts.

A cavity which has performed satisfactorily in converging target tests has been 5 inches in diameter and 1 inch thick centered in a self-propelled target body having a diameter of 6 inches. In the preferred embodiment for a self-propelled target, e.g. 10 in FIG. 2, the cavity 14C is disk-shaped, having two large flat faces, so that any impulse caused by shock waves propagated within the cavity 14C hitting those faces will result in a force normal to each face. Also in the preferred embodiment for a self-propelled target 10 simulating a converging target, the liquid-filled cavity 14C is aligned with it axis of symmmetry coincident with the longitudinal axis of the body 12 and is inclined relative to the pitch plane of the vehicle. This embodiment leads, upon impact by a projectile, to target 10 rupture along the periphery of the body 12 around the cavity 14C, separation of the target 10 into two distinct parts, and imposition of a force which tends to push each part into a radical tumble.

The liquid 16 should be a chemically inert, low-freezing point, high-boiling point liquid so as to present minimum storage and maintenance requirements. Ullage should be minimized. For normal use, a density greater than that of water, 1.00 g./ml. at 3.98 degrees C., is desireable to maximize the effect of shock waves, but weight of the liquid should be kept low, preferably below 10 pounds per gallon. Water could be used (m.p. 0 degrees C.; b.p. 100 degrees C.; density 1.00 g./ml. at 3.98 degrees C.; 8.337 lbs./gal.) for a typical, lightweight target. Ethylene glycol or 1-2-Ethanediol is another possibility (m.p. −12 degrees C.; b.p. 197.2 degrees C.; density 1.1088 at a liquid temperature of 20 degrees C. relative to water at 4 degrees C.; 9.31 lbs./gal.) and has performed well in an actual test. An aqueous solution of 1-2-Ethanediol is a yet another possibility. Numerous other liquids could, of course, be used. For testing in extreme conditions, such as the Artic, the melting points, boiling points, densities, and weights of useable liquids may differ considerably from the typical values herein presented.

When used as a drone, the target 10 includes a single rocket motor 18 which uses solid propellant inside a rocket motor case to provide boost and sustainer thrusts. Solid rocket motors are well known to those skilled in the art and will not be further described herein except for those characteristics thereof unique to the present invention. The case is made of a lightweight material to minimize hazards should impact occur. For example, it could be made of fiberglass with a carbon nozzle insert. Other possible materials are phenolic/paper and rubber. A typical size for the rocket motor 18 would be 28 inches in length and 4 inches in diameter. Such a device will provide approximately 150 pounds of boost thrust for 2 seconds and 25 pounds of sustainer thrust for 60 seconds. The target 10 would not include a rocket motor 18 when used as a towed target.

Four tail wings 20 (only three of which are shown) are made from molded foam and provide aerodynamic stability for the target 10 in free flight. Fixed flaps (not shown) may be included in the wings.

Four movable canards 22 (only three of which are shown), also made of molded foam, are included toward the front of the target 10. They may be moved under the control of a guidance control device 28 to direct the target 10 toward a target, i.e., weapons platform. These would not necessarily be included on a target for use as a towed target but they could be included.

A passive optical seeker means 24 is placed in front of the target 10 in a separate aerodynamically stabilized head piece 34 spaced apart from the main target body 12 and connected thereto by a rod-shaped neck section 36. A passive seeker means requires that an electromagnetic signal be transmitted from the weapons platform to activate the seeker means 24 and serve as a homing signal therefor. This results in lower costs, complexity, weight and size of the target 10. Alternatively, the seeker means 24 may be disposed on the forward nose section of the main target body 12. The first alternative is preferable since it is simpler, lighter, and less expensive than the other systems. This seeker means 24 may be similar to devices currently used in laser guided bombs. This seeker means 24 and rod-shaped neck section 36 would, like the canards, not necessarily be included on a target for use as a towed target but they could be included.

A fiber optic cable 26 connects the seeker means 24 to a guidance control device 28 and transmits an optical signal thereto. In response to signals picked up by the seeker means 24 and transmitted by the cable 26, the guidance control device 28 moves the canards 22 to direct the flight of the target 10. Solid state circuitry is utilized for weight and size reduction. These elements would be included on a target for use as a towed target if seeker means 24 and a guidance control device 28 were also included.

Since most of the materials used in fabricating the target 10 are transparent to radar waves, it may be necessary to include devices to enhance effective radar cross-section on the target. Such devices include, corner reflectors 30 or half wavelength dipoles in the form of commercially available metal foil chaff or wire cut to length and disposed in the foam material when the body 12 is cast. The metal included would be in very fine pieces and lightweight so as not to produce a safety hazard upon impact. Corner reflectors are not shown in FIG. 1, but if present could overlay cavity 14A.

In operation as a towed target, the target 10 is attached to a towing craft and flown on a nonconverging course with the weapons platform. The weapons crew sights, aims at, and fires upon the target 10. The target continues to fly unless and until struck by weapons fire. If a round strikes the target 10 so that a liquid-filled cavity 14A, 14B is also struck, the target 10 bursts, simulating an actual warhead detonation, and showing observers that a hit has been made.

In operation as a drone, a laser or other appropriate light source is positioned near or below the weapon implacement and is preferably reflected from a metal plate. The seeker means 24 detects this light and the guidance control device 28 directs the target 10 such that it converges upon the reflected light source. In some applications the metal reflecting plate may not be needed.

The target 10, which weighs about 20 pounds in the drone configuration, may be launched from the ground or from the air toward the weapon placement. After launch, the drone's optical guidance system 24, 26, 28 seeks the light emitted by the weapons platform and the target 10 homes in on it. The target 10 approaches the weapon and becomes visible to its gun-control radar due to reflection from the corner reflectors 30. Since the target 10 is converging upon the weapon, the gun system becomes operative and attempts to destroy the target 10.

If the target 10 is hit so that a liquid-filled cavity 14C is also hit, shock waves traveling at the speed of sound for the liquid 16, e.g. 5439 ft/sec for ethylene glycol, will be formed which are capable of bursting the cavity in which the liquid 16 is disposed and that portion of the body 12 surrounding the cavity. If the cavity 12 is disk shaped and inclined relative to the pitch plane of the vehicle, the impulse caused by the shock waves hitting the chamber faces will result in a force normal to each face and will cause the body 12 to burst and each of the bursted body sections to tumble rapidly. This maximizes destruction of the target 10.

If the target 10 is not hit, it converges upon the light emitted by the target and impacts upon the illuminated metal plate.

Upon impact, the foam body 12 of the target 10 crushes, thereby absorbing the kinetic energy of the rocket casing and other heavier parts. Since the whole target 10 weighs only about 20 pounds in this drone configuration, the total impact is minimal and not dangerous to the crew. In addition, the rocket motor 18, one of the heaviest parts of the target 10 when in the drone configuration, is made of material which will disintegrate upon impact thereby being less dangerous than a metal engine. The other devices in the target 10 are small enough that they are not dangerous upon impact. The target 10 may be launched from a distance great enough so that the solid propellant is expended by the time it impacts and hence the drone is inert during its final convergence upon the weapons platform.

This target retains all of the safety features of the prior art but represents a decided advance because it bursts when struck by a bullet, as would an actual warhead, thereby greatly increasing testing realism. Further, because a hit is readily visible, verification of operational readiness and/or determination of system effectiveness is greatly simplified by use of this target.

What is claimed is:

1. A frangible target with hydraulic warhead simulator for use as a target against a projectile-firing weapons platform, comprising:

a body adapted for aerodynamic free flight fabricated from a predetermined frangible, lightweight foamed material having at least one predetermined liquid proof cavity therein;

a liquid disposed within each cavity, minimizing ullage, serving as a medium for propogation of body-bursting shock waves caused by the impact of a projectile on said cavity;

a rocket motor disposed in a rear portion of said body and made of a non-metallic, lightweight material;

a guidance sensor disposed in a forward portion of said body and adapted to detect a signal transmitted by said weapons platform;

a guidance system connected to said guidance sensor and acting in response thereto to control a flight path of said target to realisticallly coverge upon said weapons platform; and means for reflecting radar waves integral with said body so that said body is remotely detectable by said weapons platform;

whereby upon impact of said cavity by said projectile, shock waves propogate through said liquid and lead to bursting of said cavity and catastrophic destruction of said frangible target.

2. The frangible target as claimed in claim 1 wherein said cavity is disk shaped, has a thickness of at least one length of said projectile, has faces with areas of at least 15 square inches each, and is oriented so said cavity face would appear to be a circle or an elipse with a area of at least 10 square inches if said cavity face could be seen from said weapons platform when on a converging course with said weapons platform.

3. The frangible target with hyraulic warhead simulator as claimed in claim 2, wherein said cavity is inclined relative to the pitch plane angle of said frangible target.

4. The frangible target with hydraulic warhead simulator as claimed in claim 1, wherein said liquid is chemically inert and has a high density, low melting point, and high boiling point relative to the enviroment in which said frangible target is stored and employed.

5. The frangible target with hydraulic warhead simulator as claimed in claim 1, wherein said liquid has a melting point of 0 degress Celsius or less, a boiling point of 100 degrees Celsius or greater, and a density of at least 1.00 g./ml. at 3.98 degress Celsius.

6. The frangible target with hydraulic warhead simulator as claimed in claim 5, wherein said liquid is 1-2-Ethanediol or an aqueous soltion of 1-2-Ethanediol.

* * * * *